United States Patent
Kita et al.

(10) Patent No.: US 7,947,917 B2
(45) Date of Patent: May 24, 2011

(54) WIRE-CUT ELECTRIC DISCHARGE MACHINE HAVING WATER LEVEL ABNORMALITY DETECTION FUNCTION AND WATER LEVEL ABNORMALITY ALARM GENERATION CAUSE SPECIFYING METHOD

(75) Inventors: Yuki Kita, Yamanashi (JP); Hikaru Yamane, Yamanashi (JP)

(73) Assignee: Fanuc Ltd, Minamitsuru-gun (JP)

( * ) Notice: Subject to any disclaimer, the term of this patent is extended or adjusted under 35 U.S.C. 154(b) by 228 days.

(21) Appl. No.: 12/248,071

(22) Filed: Oct. 9, 2008

(65) Prior Publication Data

US 2009/0152244 A1 Jun. 18, 2009

(30) Foreign Application Priority Data

Dec. 13, 2007 (JP) ................................ 2007-322537

(51) Int. Cl.
*B23H 7/02* (2006.01)
*B23H 1/10* (2006.01)
*B23H 7/20* (2006.01)

(52) U.S. Cl. .... 219/69.12; 210/86; 210/143; 219/69.14; 700/162

(58) Field of Classification Search ............... 219/69.12, 219/69.14, 69.17, 69.19; 700/162; 210/86, 210/143, 171
See application file for complete search history.

(56) References Cited

U.S. PATENT DOCUMENTS

| | | | | |
|---|---|---|---|---|
| 5,081,332 A | * | 1/1992 | Sakuragawa | ............... 219/69.12 |
| 5,446,255 A | | 8/1995 | Blondy et al. | |
| 6,790,362 B2 | * | 9/2004 | FitzGerald et al. | ........... 210/143 |
| 7,089,154 B2 | * | 8/2006 | Rasmussen et al. | .......... 702/183 |
| 2004/0164206 A1 | * | 8/2004 | Jammu et al. | ............. 246/167 R |
| 2005/0023195 A1 | * | 2/2005 | Kita et al. | .................... 210/143 |

FOREIGN PATENT DOCUMENTS

| | | | |
|---|---|---|---|
| JP | 61004627 A | | 1/1986 |
| JP | 64-081008 A | | 3/1989 |
| JP | 11-119815 A | * | 4/1989 |
| JP | 03-154847 A | | 7/1991 |
| JP | 04-300123 A | | 10/1992 |
| JP | 2000-94856 A | * | 4/2000 |
| JP | 2003-71578 A | * | 3/2003 |

OTHER PUBLICATIONS

Machine translation of Japan Patent document 11-119,815, Aug. 2010.*
Notice of Reasons for Rejection for JP2007-322537 mailed Mar. 3, 2009.
EP Search Report for 08166279.3 dated Mar. 1, 2011.

* cited by examiner

*Primary Examiner* — Geoffrey S Evans
(74) *Attorney, Agent, or Firm* — Lowe Hauptman Ham & Berner, LLP

(57) ABSTRACT

For specifying a cause of generation of a water level abnormality alarm in a wire-cut electric discharge machine, stopping supply of a machining liquid to a machining tank when the alarm is generated, draining the liquid; measuring an amount of change in the water level per unit time that is detected by the water level detecting unit; and displaying a question to an operator about the measured amount of change in water level and the state of a water level adjusting mechanism. The operator manually inputs an answer to the displayed question, and specifies, from the answer input by means of the inputting unit, a part which causes the generation of the alarm.

8 Claims, 7 Drawing Sheets

QUESTION SCREEN 1

QUESTION SCREEN 2

QUESTION SCREEN 3

QUESTION SCREEN 4

FIG. 5B

QUESTION SCREEN 5

WATER LEVEL AFTER GENERATION OF ALARM

DOES NOT FALL    SLOWLY FALLS    RAPIDLY FALLS

QUESTION SCREEN 6

WATER SUPPLY QUANTITY IS

SUFFICIENT    NOT SUFFICIENT

QUESTION SCREEN 7

COUPLING

FUNCTIONS NORMALLY    MALFUNCTIONS

FIG. 6

| WARNING SCREEN a | WARNINIG: FAILURE IN PRESSURE SENSOR |

| WARNING SCREEN b | WARNING: FAILURE IN SERVO MOTOR |

| WARNING SCREEN c | WARNING: FAILURE IN COUPLING |

| WARNING SCREEN d | WARNING: CLOGGING IN DRAIN PORT |

| WARNING SCREEN e | WARNING: INCREASE IN WATER LEAKAGE QUANTITY |

| WARNING SCREEN f | WARNING: SHORTAGE OF WATER SUPPLY QUANTITY |

WIRE-CUT ELECTRIC DISCHARGE MACHINE HAVING WATER LEVEL ABNORMALITY DETECTION FUNCTION AND WATER LEVEL ABNORMALITY ALARM GENERATION CAUSE SPECIFYING METHOD

RELATED APPLICATIONS

The present application is based on, and claims priority from, Japan Application Number 2007-322537, filed Dec. 13, 2007, the disclosure of which is hereby incorporated by reference herein in its entirety.

BACKGROUND OF THE INVENTION

1. Field of the Invention

The present invention relates to a wire-cut electric discharge machine having a water level abnormality detection function and to a water level abnormality alarm generation cause specifying method.

2. Description of the Related Art

There are two types of wire-cut electric discharge machines. One is of a spraying type in which a machining tank is not filled with a machining liquid but machining is performed while spraying a machining liquid onto a wire electrode through nozzles fixed at an inlet and an outlet of each of upper and lower wire guides. The other is of a soaking type in which a workpiece is secured inside of a machining tank in order to enhance a machining speed and a machining accuracy, the machining tank is filled with a machining liquid, and then, the workpiece is soaked in the machining liquid.

In a wire-cut electric discharge machine of the soaking type, the water level of the machining tank need to be varied according to the height of the workpiece, and therefore, various water level adjusting mechanisms are devised, as the following items 1) to 3).

1) A type in which the water level is adjusted to the height of the workpiece by manually moving an overflow gate in a vertical direction;

2) another type in which the overflow gate is driven by an actuator in such a manner as to automatically follow a height of a Z axis for holding an upper wire electrode therein (generally, the height of the Z axis and the height of the workpiece establish a proportional relationship); and 3) a further type provided with a water level detecting unit such as a pressure gage capable of sequentially detecting a water level and a water level adjusting mechanism for feeding back a signal from the water level detecting unit so as to adjust the water level. The water level adjusting mechanism of this type can be used in a situation in which the water level need to be set irrespective of the height of the Z axis for holding the wire electrode therein (e.g., a situation in which water is drained only to a level of a workpiece mount during automatic wire connection in order to minimize a change in temperature when the workpiece is replaced with another).

Japanese Patent Application Laid-open No. 4-300123 discloses a technique of a wire-cut electric discharge machine provided with a water level automatic adjusting technique for automatically replenishing a machining liquid which is decreased in quantity during operation of the machine.

Although not in the technical field of the wire-cut electric discharge machine, Japanese Patent Application Laid-open No. 1-81008 discloses a technique of providing a knowledge base section, in which expert knowledge about a diagnosis of a cause of failure is accumulated, inputting the expert knowledge into the knowledge base section via interaction unit, and eliciting the cause of the failure in accordance with the knowledge base section.

Otherwise, Japanese Patent Application Laid-open No. 3-154847 discloses a technique of diagnosing a cause of failure in accordance with a failure tree (i.e., a failure result estimation tree diagram) having a configuration in which a plurality of alternatives are provided with respect to one question relating to a cause of failure diagnosing object, and, from each of these alternatives, some questions and alternatives are branched, and then an alternative in a final stage reaches the cause of the failure, respectively.

The workpiece or a table mounting the workpiece thereon is deformed due to thermal expansion caused by a change in temperature, thereby causing degradation of machining accuracy or disconnection of the wire electrode. As a consequence, the change in temperature needs to be suppressed to the minimum in order to achieve machining with high accuracy in the wire-cut electric discharge machine. In view of this, the water needs to be stored in the machining tank even during an initial setup.

Therefore, it is desirable to use the above-described electric discharge machine of the soaking type provided with the water level detecting unit for sequentially detecting the water level and the water level adjusting mechanism for feeding back the detection signal so as to adjust the water level.

However, the water level detecting unit or the water level adjusting mechanism is exposed to sewage including sludge (metallic fine powder) produced by an electric discharge machining. As a consequence, there arises a problem that a failure caused by fixture of the sludge or abrasion due to the sludge is liable to occur in the water level detecting unit or the water level adjusting mechanism. Actually, in case where a failure occurs in a water level adjusting system including the water level detecting unit and the water level adjusting mechanism, it is necessary to suppress a down time (i.e., an inoperable time) of the electric discharge machine to a short period of time.

SUMMARY OF THE INVENTION

In view of the above, an object of the present invention is to provide a wire-cut electric discharge machine having a water level abnormality detection function and a water level abnormality alarm generation cause specifying method, in which a guidance is displayed on a display screen mounted on the wire electric discharge machine so as to allow an operator to specify alarm generation cause in a question format, thereby allowing to specify the cause of failure generation in a water level detecting unit or a water level adjusting mechanism constituting a water level adjusting system.

A wire-cut electric discharge machine according to the present invention has water supplying unit for supplying a machining liquid to a machining tank, draining unit for draining the machining liquid from the machining tank, detecting unit for detecting a water level of the machining liquid stored in the machining tank and a water level adjusting mechanism for supplying or draining the machining liquid based on a detection value detected by the water level detecting unit so as to adjust the water level of the machining tank, and has a water level abnormality detection function for generating a water level abnormality alarm when a difference between the water level detected by the water level detecting unit and a target water level exceeds a predetermined range.

The wire-cut electric discharge machine according to a first aspect of the present invention comprises: outputting unit for stopping the supply of the machining liquid to the machining tank so as to output a drain instruction when the alarm is generated; displaying unit for displaying a question to an operator about the amount of change in the water level and a state of the water level adjusting mechanism; inputting unit for inputting an answer to the question displayed on the displaying unit; and cause specifying unit for specifying, from the answer input by means of the inputting unit, a part which causes the generation of the alarm.

Moreover, the wire-cut electric discharge machine according to a second aspect of the present invention comprises: outputting unit for stopping the supply of the machining liquid to the machining tank so as to output a drain instruction when the alarm is generated; measuring unit for measuring an amount of change in the water level per unit time that is detected by the water level detecting unit; displaying unit for displaying, according to the amount of change measured by the measuring unit, a question to an operator about a state of the water level adjusting mechanism; inputting unit for inputting an answer to the question displayed on the displaying unit; and cause specifying unit for specifying, from the answer input by means of the inputting unit, a part which causes the generation of the alarm.

Here, the questions to an operator about the state of the water level adjusting mechanism, displayed on the displaying unit, may include clogging in a drain port, the existence of alarm information on a servo motor for opening and closing a drain port valve, excess or shortage of a water supply quantity and the existence of an abnormality in a coupling for coupling the servo motor and the drain port valve to each other.

The water level abnormality alarm generation cause specifying method in a wire-cut electric discharge machine is applied to a wire-cut electric discharge machine having water supplying unit for supplying a machining liquid to a machining tank, draining unit for draining the machining liquid from the machining tank, detecting unit for detecting a water level of the machining liquid stored in the machining tank and a water level adjusting mechanism for supplying or draining the machining liquid based on a detection value detected by the water level detecting unit so as to adjust the water level of the machining tank, and having a water level abnormality detection function for generating a water level abnormality alarm when a difference between the water level detected by the water level detecting unit and a target water level exceeds a predetermined range.

The water level abnormality alarm generation cause specifying method according to a first aspect of the present invention comprises the steps of: stopping the supply of the machining liquid to the machining tank so as to drain the machining liquid when the alarm is generated; displaying a question to an operator about a change in water level and a state of the water level adjusting mechanism; inputting an answer to the displayed question; and specifying, from the answer input by means of the inputting unit, a part which causes the generation of the alarm.

The water level abnormality alarm generation cause specifying method according to a second aspect of the present invention comprises the steps of: stopping the supply of the machining liquid to the machining tank so as to drain the machining liquid when the alarm is generated; measuring an amount of change in the water level per unit time that is detected by the water level detecting unit; displaying a question to an operator about the measured amount of change in the water level and a state of the water level adjusting mechanism; inputting an answer to the displayed question; and specifying, from the answer input by means of the inputting unit, a part which causes the generation of the alarm.

With the above-described arrangement, according to the present invention, in case where a malfunction occurs in the water level adjusting system provided on the electric discharge machine, an operator can speedily specify a malfunction part, and then, can get down a recovery work at the malfunction part, thereby suppressing the down time of the electric discharge machine. Additionally, according to the present invention, questions to the operator for specifying a part of failure are displayed on the display screen mounted on the electric discharge machine so as to instruct the operator the work contents to be done, with the result that it is unnecessary to provide various detecting units for detecting the malfunction occurring in the water level adjusting system to the electric discharge machine, thereby simplifying the configuration of the electric discharge machine and reducing a cost.

BRIEF DESCRIPTION OF THE DRAWINGS

The above described and other objects and features of the present invention will be apparent from embodiments in reference to the attached drawings, in which:

FIG. 5B is a diagram exemplifying a display of a screen, on which question screens 5 to 7 to an operator are displayed; and FIG. 6 is a diagram exemplifying a display of a screen, on which a specified failure cause is displayed.

DETAILED DESCRIPTION OF THE EMBODIMENTS

Figure 1:
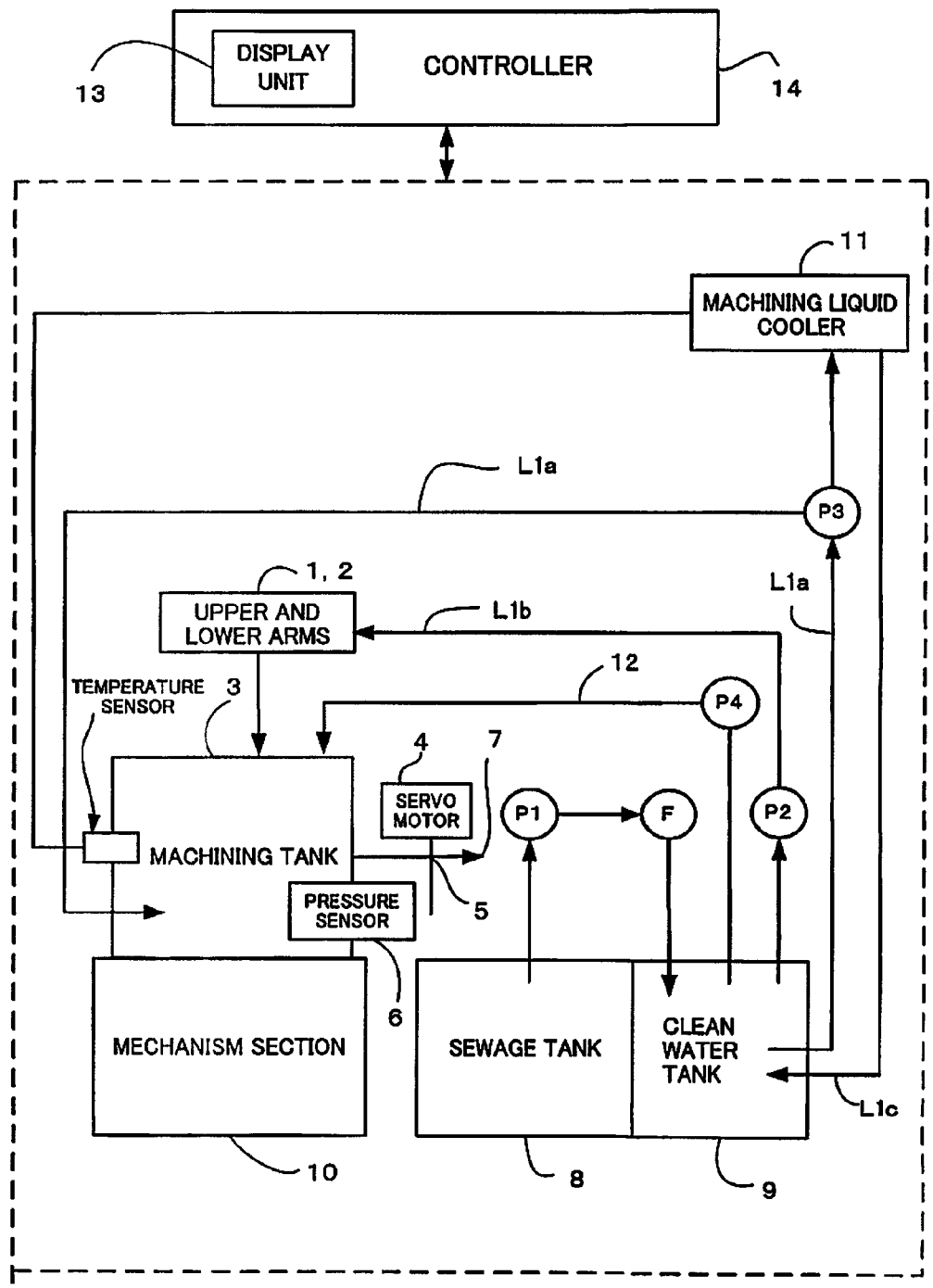
FIG. 1 is a block diagram schematically illustrating a wire-cut electric discharge machine in a first embodiment according to the present invention.

FIG. 1 is a block diagram schematically illustrating a wire-cut electric discharge machine in a first embodiment according to the present invention.

In a wire-cut electric discharge machine, a wire electrode (not shown) is moved relative to a workpiece while an electric discharge is generated by applying a voltage to between the workpiece and the wire electrode securely mounted on a table (not shown) disposed in a mechanism section 10, so that the workpiece is subjected to electric discharge machining. In case where a machining liquid is to be rapidly stored inside of a machining tank 3, a machining liquid supplying path 12 for rapid storing is used. Thereafter, the machining liquid is replenished via another machining liquid supplying path L1*a*. The machining liquid stored in the machining tank 3 contains machining chips generated by the electric discharge machining, and therefore, is supplied to a sewage tank 8.

The machining liquid recovered and stored in the sewage tank 8 is pumped up by a pump P1 for a filter, filtrated through a filter F so that the machining chips or the like are removed, and then, is supplied to a clean water tank 9. The machining liquid stored in the clean water tank 9 is pumped up by a circulating pump P3 via the machining liquid supplying path L1a, and then, is branched into two flows at its outlet. One flow is supplied as replenish water to the machining tank 3 via the machining liquid supplying path L1a whereas the other flow is supplied to a machining liquid cooler 11, to be controllably cooled, and then, is returned to the clean water tank 9 via a machining liquid feedback path L1c.

In the machining tank 3 is provided a pressure sensor 6 for measuring a water level of the machining liquid stored in the machining tank 3. Moreover, there is provided a drain unit in the machining tank 3, and further, a drain port 7 is formed in such a manner that the machining liquid stored in the machining tank 3 flows out to the sewage tank 8. The drain unit is constituted of the drain port 7, a drain port valve 5 and a servo motor 4 for opening or closing the drain port valve 5.

The wire-cut electric discharge machine indicated by a dotted line in FIG. 1 is controlled by a controller 14. The controller 14 includes a display unit 13.

Figure 2:
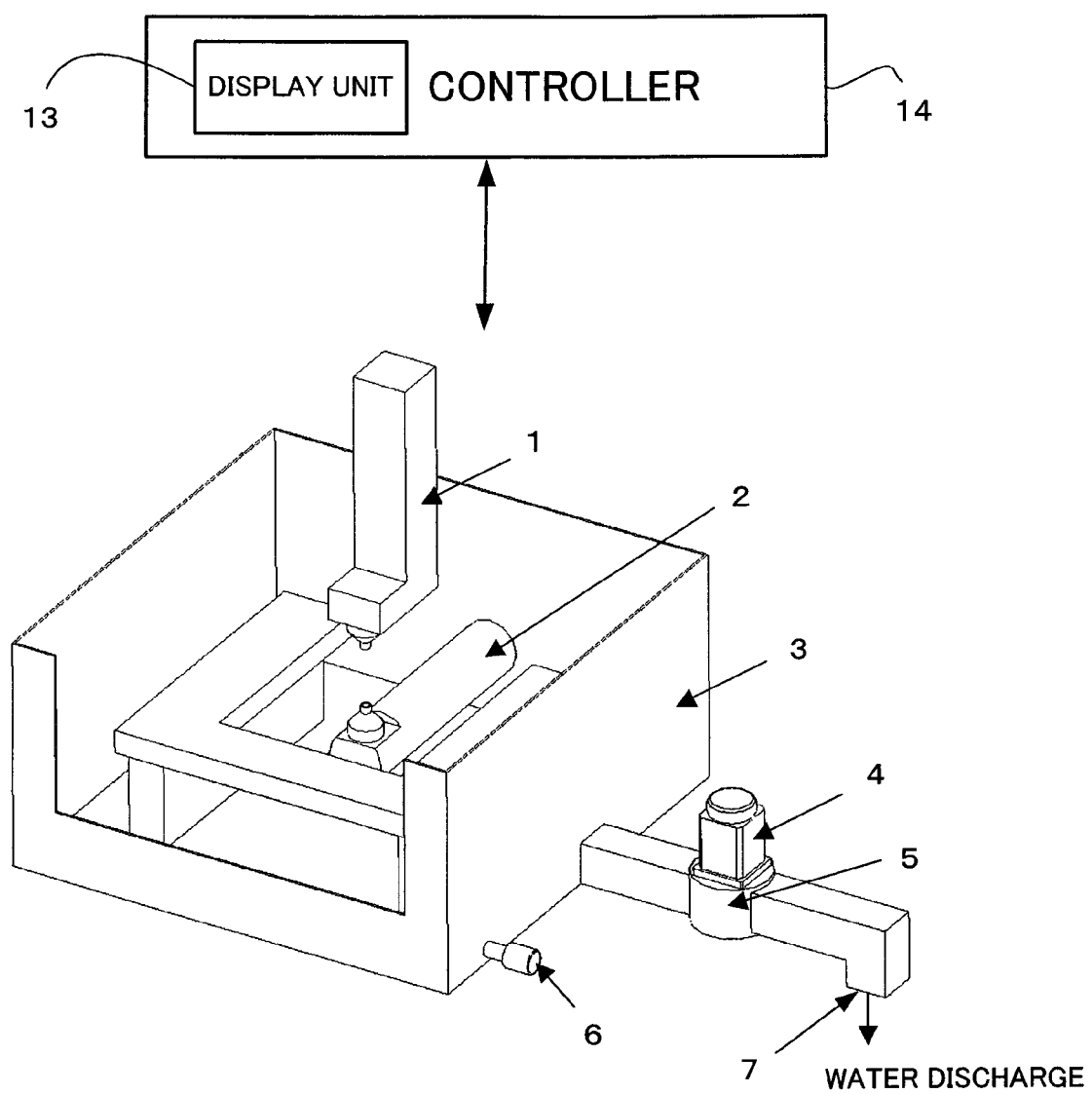
FIG. 2 is a view schematically showing the surroundings of a machining tank in the wire-cut electric discharge machine illustrated in FIG. 1.

FIG. 2 is a view schematically showing the surroundings of the machining tank 3 in the wire-cut electric discharge machine illustrated in FIG. 1. As for the machining tank 3, the pressure sensor is used as water level detecting unit, and further, the servo motor is used as a water level adjusting mechanism. A water level of the machining liquid stored in the machining tank 3 can be measured by detecting a liquid pressure of the machining liquid by the pressure sensor 6. Moreover, the water level of the machining liquid is adjusted by adjusting the aperture of the drain port valve 5 by means of the servo motor 4.

During the electric discharge machining, the workpiece is machined while jetting the machining liquid from an upper guide 1 and a lower guide 2 which support the wire electrode. In view of this, the drain port valve 5 normally remains opened by predetermined amount in such a manner that the machining liquid is drained by a quantity enough to fill the machining tank 3. Incidentally, the drain port valve 5 is structured such that the machining liquid can leak out in a slight quantity even in a fully closed state. In the electric discharge machining with respect to a normal workpiece, the water level inside of the machining tank 3 is adjusted in the following sequence: "a position of a Z axis is determined according to a thickness of a workpiece"→"a target water level is determined according to the position of the Z axis"→"the water level is detected by the pressure sensor"→"an excess or a shortage of the water level is adjusted by the aperture of the drain port valve." If an abnormality or a failure occurs in the water level adjusting mechanism such as the pressure sensor 6, the servo motor 4 or the drain port valve 5 shown in FIG. 2, the water level in the machining tank 3 cannot be maintained in the vicinity of the predetermined position of the Z axis.
Case I: In case where the water level becomes abnormal since the water level exceeds an upper limit in the vicinity of the position of the Z axis, the following four causes a to d are assumed to be causes of failure in the water level adjusting system:
  cause a: failure in the pressure sensor;
  cause b: failure in the servo motor;
  cause c: failure in the coupling for coupling the servo motor and the drain port valve to each other; and
  cause d: clogging in the drain port.
Case II: In case where the water level becomes abnormal since the water level falls below a lower limit in the vicinity of the position of the Z axis, the following five causes a to c, e and f are assumed to be causes of failure in the water level adjusting system:
  cause a: failure in the pressure sensor;
  cause b: failure in the servo motor;
  cause c: failure in the coupling for coupling the servo motor and the drain port valve to each other;
  cause e: shortage of water supply quantity; and
  cause f: an increase in water leakage quantity.
Here, in Cases I and II described above, the same failure cause is designated by the same reference character.

Next, explanation will be made on an embodiment in which the failure generation causes a to f are specified by the wire-cut electric discharge machine having the water level abnormality detection function and a water level abnormality alarm generation cause specifying method in reference to FIGS. 3 to 5B.

In the present embodiment, a water level abnormality alarm is generated when a difference between a detected water level and a target water level reaches a predetermined upper or lower limit. Moreover, in order to prevent any water leakage, the machining liquid flowing into the machining tank 3 is stopped, the drain port valve 7 is fully opened, the machining liquid stored in the machining tank 3 is made to flow out, and the wire electric discharge machine is stopped. Normally, the sewage tank 8 has a capacity greater than that of the machining tank 3, and therefore, no machining liquid can leak from the sewage tank 8 even if the machining liquid stored in the machining tank 3 is drained to the sewage tank 8.

Figure 3:
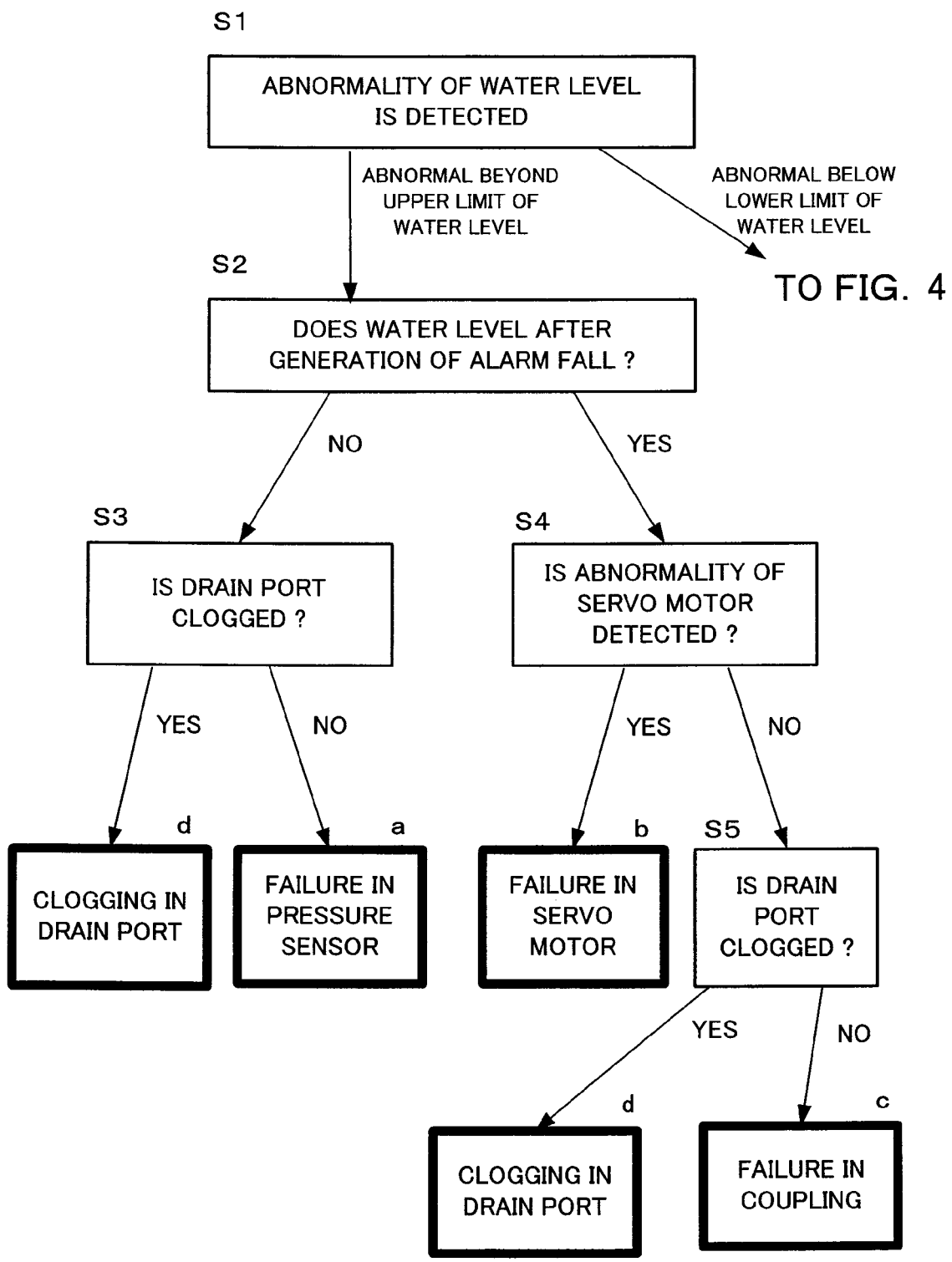
FIG. 3 is a tree diagram exemplifying a cause specifying process in a case where a water level rises beyond a Z axis to get into an alarm state.

Referring to FIG. 3, when an abnormality of the water level is detected based on an output from the pressure sensor 6 (S1), question screen 1 (FIG. 5A) is displayed on the display unit 13, and then, an operator is urged to select whether the abnormality of the water level is "abnormal beyond upper limit of water level" or "abnormal below lower limit of water level." The machining liquid (L1a, L1b) flowing into the machining tank 3 is stopped, the servo motor 4 is instructed to fully open the drain port valve 5, the machining liquid stored in the machining tank 3 is made to flow out to the sewage tank 8, and then, the wire electric discharge machine is stopped. Here, instead of urging the operator to selectively specify whether the abnormality of the water level in the machining tank 3 is the abnormality beyond the upper limit of water level or the abnormality beyond the lower limit of water level, the controller 14 in the wire electric discharge machine may be determined based on the output from the pressure sensor 6 as to whether the abnormality is the abnormality beyond the upper limit or the abnormality beyond the lower limit.
(Abnormality Beyond Upper Limit of Water Level)

In reference to FIG. 3, a description will be given below of the case of the abnormality beyond the upper limit of water level and selection of "abnormality beyond upper limit of water level" on question screen 1 in FIG. 5A by the operator. FIG. 3 is a tree diagram exemplifying a diagnosis process in a case where water level rises beyond the upper limit to get into an alarm state. According to a flow of the tree diagram, explanation will be made on how to specify the above-described failure generation causes a to d.

In order to urge the operator to determine whether the water level falls or not after the alarm is generated (S2), question screen 2 (FIG. 5A) is displayed on the display unit 13. Moreover, the operator is urged to select on screen 2 whether the water level to be detected by the pressure sensor 6 "falls" or "does not fall" after the alarm is generated. A change in water level after the generation of alarm can be detected by monitoring a change in water level detected by the pressure sensor 6 after the generation of alarm by the controller 14 in the wire electric discharge machine.

If the operator selects that the water level after generation of the alarm "does not fall", then question screen 3 (FIG. 5A) is displayed on the display unit 13 to determine whether the drain port 7 is clogged or not (S3). And then, the operator is urged to select on screen 3 whether the drain port 7 is "clogged" or "not clogged." The operator may check clogging in the drain port 7 with foreign matters by confirming the flow of the water through the drain port 7.

The machining tank 3 in the wire electric discharge machine is configured such that the machining liquid tends to be drained a slight quantity even if the drain port valve 5 is fully closed. As a consequence, if no change in output from the pressure sensor 6 is found, it is estimated that such no change in output from the pressure sensor 6 is caused by clogging in the drain port 7 with foreign matters (cause d) or failure in the pressure sensor 6 (cause a), not by failure in the servo motor 4, the coupling or the like.

If the operator selects that the water level "falls" on question screen 2 (FIG. 5A) displayed on the display unit 13 (S2), on the other hand, then question screen 4 (FIG. 5A) is displayed on the display unit 13 to urge the operator to determine whether an abnormality of the servo motor 4 is detected or not (S4). And then, the operator is urged to select on screen 4 whether the abnormality of the servo motor 4 is "detected" or "not detected." The operator can confirm whether the abnormality of the servo motor 4 occurs or not by observing the servo motor 4 or by using a standard servo motor abnormality detection function provided on the controller 14 in the wire electric discharge machine. If the operator selects that the abnormality of the servo motor 4 is "detected," the failure in the servo motor (cause b) is specified.

If the operator selects that the abnormality of the servo motor 4 is "not detected," on the other hand, then question screen 5 (FIG. 5A) is displayed on the display unit 13 to determine whether the drain port 7 is clogged or not (S5). And then, the operator is urged to select on the screen 3 whether the drain port 7 is "clogged" or "not clogged." In case where the drain port 7 is clogged, the cause of the failure is determined to be clogging in the drain port 7 (cause d). In case where the drain port 7 is not clogged, on the other hand, the cause of the failure is determined to be failure in the coupling (cause c). The cause of failure or malfunction determined in this way is displayed on the display unit 13, in the form of warning screens a to f in FIG. 6 which display the causes of the failure, for example, whereby the operator can speedily and definitely recognize the cause of the failure.

(Abnormality Below Lower Limit of Water Level)

Figure 4:
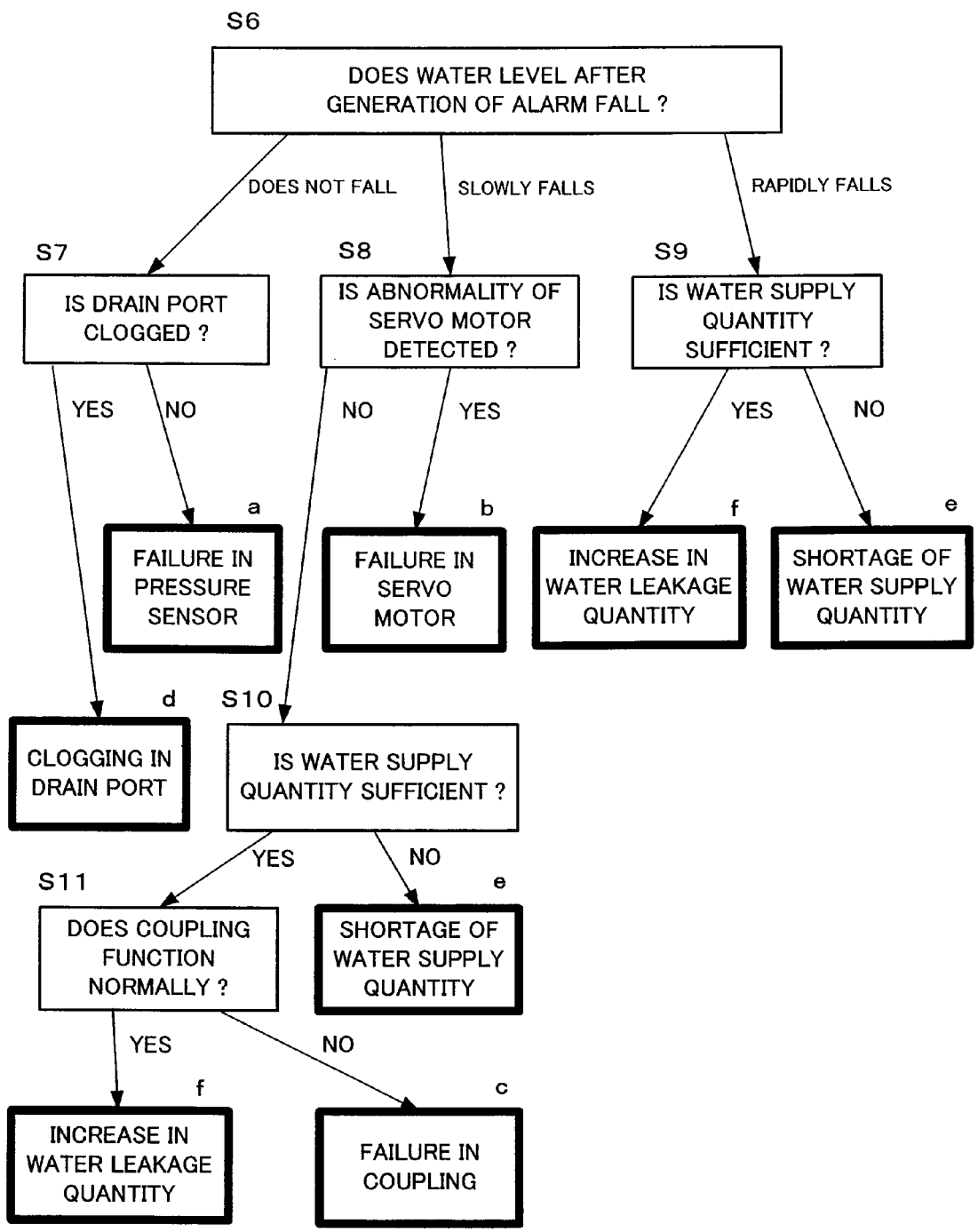
FIG. 4 is a tree diagram exemplifying a cause specifying process in a case where water level falls below the Z axis to get into an alarm state.

Next, a description will be given, in reference to FIG. 4, of the case where the water level is abnormal as being beyond the low limit and the operator selects "abnormal below lower limit of water level" on screen 1 in FIG. 5A. FIG. 4 is a tree diagram exemplifying a diagnosis process in a state where alarm is generated as the water falls below the lower limit. Explanation will be made on specifying the above-described failure generation causes a to c, e and f in accordance with a flow of the tree diagram.

If the operator selects "abnormal below lower limit of water level" on screen 1 in FIG. 5A, then question screen 5 (FIG. 5B) is displayed on the display unit 13 to urge the operator to determine whether the water level after the generation of alarm falls or not (S6). Moreover, the operator is urged to select whether the water level after the generation of alarm "does not fall", "slowly falls" or "rapidly falls." A change in water level after the generation of alarm can be detected by monitoring, by the controller 14 in the wire electric discharge machine, a change in water level detected by the pressure sensor 6 after the generation of alarm.

Figure 5A:
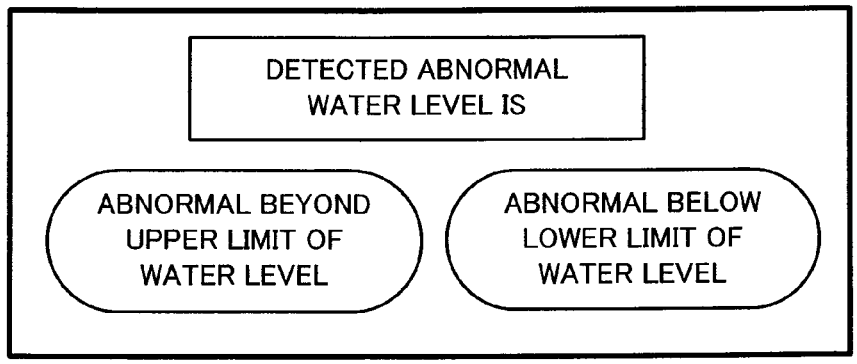
FIG. 5A is a diagram exemplifying a display of a screen, on which question screens 1 to 4 to an operator are displayed.
Figure 5A:
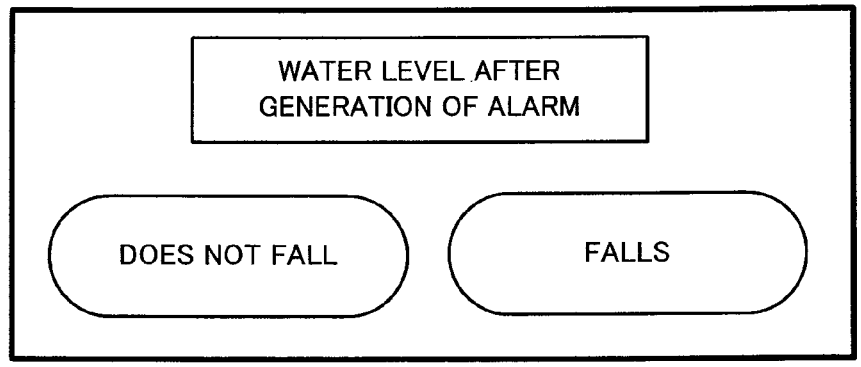
Figure 5A:
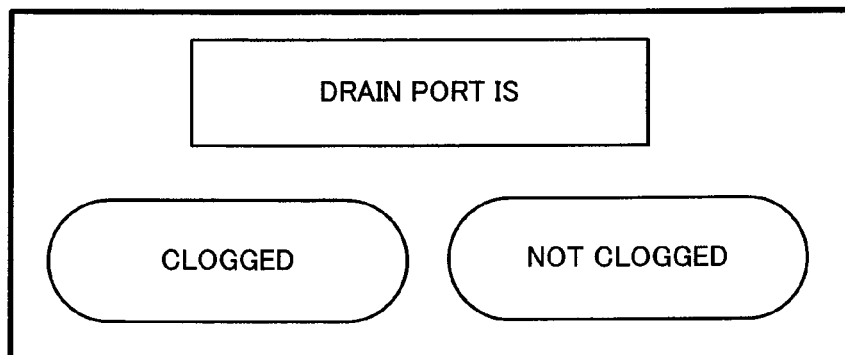
Figure 5A:
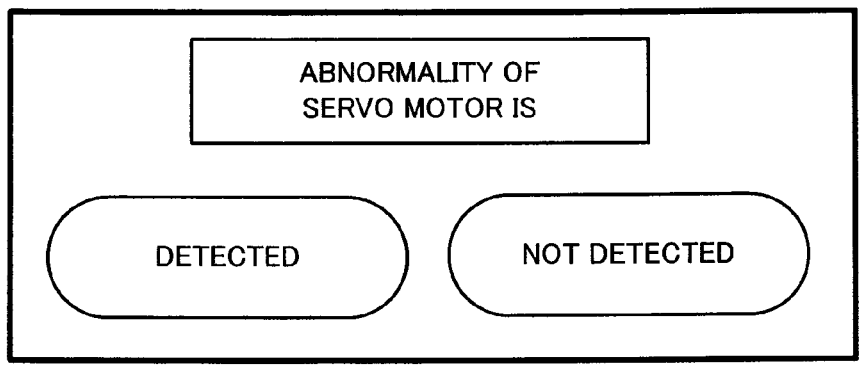

If the operator selects "does not fall" on screen 5 in FIG. 5B since the water level detected by the pressure sensor 6 after the generation of alarm does not fall, then question screen 3 (FIG. 5A) is displayed on the display unit 13 to determine whether the drain port 7 is clogged or not (S7). And then, the operator is urged to select whether the drain port 7 is "clogged" or "not clogged." Clogging in the drain port 7 with foreign matters may be determined by confirming the flow of the water through the drain port 7 by the operator. As described above, the machining tank 3 in the wire electric discharge machine is configured such that the water tends to be drained a slight quantity even if the drain port valve 5 is fully closed. As a consequence, if no change in output from the pressure sensor 6 is found, it is estimated that such no change in output from the pressure sensor 6 is caused by clogging in the drain port 7 with foreign matters (cause d) or failure in the pressure sensor 6 (cause a), not by failure in the servo motor 4, the coupling or the like.

If the operator selects "slowly descended" on screen 5 in FIG. 5B, on the other hand, since the water level detected by the pressure sensor 6 after the generation of alarm falls slowly, then question screen 4 (FIG. 5A) is displayed on the display unit 13 to urge the operator to select whether an abnormality of the servo motor 4 is detected or not. The operator can confirm whether the abnormality of the servo motor 4 occurs or not using a standard servo motor abnormality detection function provided on the controller 14 in the wire electric discharge machine or by observing the servo motor 4. And if the operator selects that the abnormality of the servo motor 4 is "detected," the failure in the servo motor (cause b) is specified.

If the operator selects "not detected" on the screen 4 in FIG. 5A since no abnormality of the servo motor 4 is detected, then question screen 6 (FIG. 5B) is displayed on the display unit 13 to determine whether a water supply quantity is sufficient or not (S10). Whether the water supply quantity is sufficient or not can be determined by monitoring a flow rate meter for measuring the water supply quantity, clogging in a water supplying hose or shortage of the water supply quantity due to failure in the water supplying pump. If the operator selects the water supply quantity is "not sufficient," the cause of the failure is determined to be shortage of the water supply quantity (cause e). If the operator selects that the water supply quantity is "sufficient", on the other hand, then question screen 7 (FIG. 5B(7)) is displayed on the display unit 13 to urge the operator to select whether the coupling is in normal condition or not (S11). The operator can confirm whether the coupling functions normally or not by visually monitoring the operating state of the coupling. If the operator selects that the coupling "functions normally" on screen 7 in FIG. 5B since no abnormality is found in the coupling, then the cause of the failure is determined to be increase in water leakage (cause f). If the operator selects that the coupling "malfunctions" on screen 7 in FIG. 5B, on the other hand, since abnormality is found in the coupling, then the cause of the failure is determined to be failure in the coupling (cause c). If the operator selects "malfunctions" as the coupling does not function normally, on the other hand, then the failure in the coupling (cause c) is specified.

If the operator selects "rapidly falls" on screen 5 in FIG. 5B, on the other hand, since the water level detected by the pressure sensor 6 after the generation of alarm falls rapidly, then question screen 3 (FIG. 5B) is displayed on the display unit 13 to determine whether the water supply quantity is sufficient or not (S9). And then, the operator is urged to select on screen 6 whether the water supply quantity is "sufficient" or "not sufficient." If the operator selects that the water supply quantity is "sufficient," then the increase in water leakage (cause f) is specified to be the cause of the failure. If the operator selects that the water supply quantity is "not sufficient," on the other hand, the shortage of the water supply quantity (cause e) is specified to be the cause of the failure. As described above, whether the water supply quantity is sufficient or not can be determined by confirming the flow rate meter for monitoring the water supply quantity, the clogging in the water supplying hose or the shortage of the water supply quantity due to the failure in the water supplying pump.

If the water level rises beyond the upper limit so that alarm is generated, the causes can be limited to the four items, (1) failure in the pressure sensor 6, (2) failure in the servo motor 4, (3) failure in the coupling for coupling the servo motor 4 and the drain port valve 5 to each other, and (4) clogging in the drain port 7, according to the flow illustrated in FIG. 3 by monitoring the output from the pressure sensor 6 after the generation of alarm.

If no change is detected in output from the pressure sensor 6 when the controller monitors the output from the pressure sensor 6 after the generation of alarm of water level abnormality by the controller, it can be determined that the drain port 7 is clogged or the pressure sensor 6 is inoperative. In this case, it is inconceivable that the servo motor 4 or the coupling is inoperative since a slight quantity of water tends to be drained even if the drain valve is fully closed. Clogging of foreign matters in the drain port 7 can be detected by using a flow rate sensor for detecting the flow of water.

If the output from the pressure sensor 6 drops after the instruction of drain of the water stored in the machining tank 3, the abnormality of the servo motor 4 is detected by using the standard servo motor abnormality detection function provided on the controller. In case where the servo motor 4 is in working order, the state of the drain port 7 is detected by means of the flow rate sensor disposed at the drain port 7. In case where the drain port 7 is not clogged, the coupling for coupling the servo motor 4 and the drain port valve 5 to each other can be regarded as the cause of generation of alarm notifying of water level abnormality.

In case where the water level falls below the lower limit so that alarm is generated, it is conceivable that the cause of alarm generation is limited to the six items, (1) failure in the pressure sensor 6, (2) failure in the servo motor 4, (3) failure in the coupling for coupling the servo motor 4 and the drain port valve 5 to each other, (4) shortage of the water supply quantity, (5) increase in water leakage quantity and (6) clogging in the drain port 7, according to the flow illustrated in FIG. 4.

Like in case where the water level rises beyond the upper limit so that alarm is generated, the controller 14 monitors the output from the pressure sensor 6 after the generation of alarm so that whether the pressure sensor 6 is in working order or not is determined. Next, the signal of the servo motor 4 transmitted to the controller 14 is confirmed so that whether the servo motor 4 functions normally or not is determined. If the servo motor 4 functions normally, whether or not the shortage of the water supply quantity is generated due to clogging in the water supplying hose or the failure in the water supplying pump is determined by confirming the signal from the flow rate meter for measuring the water supply quantity. If the water supply quantity is sufficient, whether the coupling for coupling the servo motor 4 and the drain port valve 5 to each other is out of order or not is determined. If the coupling is determined to be in working order, the increase in water leakage quantity can be regarded as the cause of the generation of alarm notifying of water level abnormality. As for the detection of failure in the coupling, the breakage of the coupling may be automatically detected by applying a slight voltage to the coupling and monitoring a change in voltage.

Instead of urging the operator to specify the cause of the failure using the question format, it is possible to use, for specifying a part of failure, units for detecting the respective states of the five elements, (1) pressure sensor, (2) servo motor, (3) clogging in a drain port, (4) coupling, and (5) the water supply quantity.

The invention claimed is:

1. A wire-cut electric discharge machine having a water supplying unit for supplying a machining liquid to a machining tank, a draining unit for draining the machining liquid from the machining tank, a detecting unit for detecting a water level of the machining liquid stored in the machining tank, and a water level adjusting mechanism for supplying or draining the machining liquid based on a detection value detected by the water level detecting unit so as to adjust the water level of the machining tank, said machine having a water level abnormality detection function for generating a water level abnormality alarm when a difference between the water level detected by the water level detecting unit and a target water level exceeds a predetermined range, the wire-cut electric discharge machine comprising:
   an outputting unit for stopping the supply of the machining liquid to the machining tank so as to output a drain instruction when the alarm is generated;
   a displaying unit for displaying questions to an operator about
      (i) a change in the water level after the alarm is generated, and
      ii) a state of the water level adjusting mechanism;
   an inputting unit for inputting an answer to the question displayed on the displaying unit; and
   a cause specifying unit for specifying, from the answer input by means of the inputting unit, a part which causes the generation of the alarm.

2. A wire-cut electric discharge machine having a water supplying unit for supplying a machining liquid to a machining tank, a draining unit for draining the machining liquid from the machining tank, a detecting unit for detecting a water level of the machining liquid stored in the machining tank, and a water level adjusting mechanism for supplying or draining the machining liquid based on a detection value detected by the water level detecting unit so as to adjust the water level of the machining tank, said machine having a water level abnormality detection function for generating a water level abnormality alarm when a difference between the water level detected by the water level detecting unit and a target water level exceeds a predetermined range, the wire-cut electric discharge machine comprising:
   an outputting unit for stopping the supply of the machining liquid to the machining tank so as to output a drain instruction when the alarm is generated;
   a measuring unit for measuring an amount of change in the water level per unit time that is detected by the water level detecting unit;
   a displaying unit for displaying, according to the amount of change measured by the measuring unit, a question to an operator about a state of the water level adjusting mechanism;
   an inputting unit for inputting an answer to the question displayed on the displaying unit; and
   a cause specifying unit for specifying, from the answer input by means of the inputting unit, a part which causes the generation of the alarm.

3. The wire-cut electric discharge machine according to claim 2, wherein the questions displayed on the displaying unit to the operator about the state of the water level adjusting mechanism include questions regarding:

clogging in a drain port,
the existence of alarm information on a servo motor for opening and closing a drain port valve,
excess or shortage of a water supply quantity, and
the existence of an abnormality in a coupling for coupling the servo motor and the drain port valve to each other.

4. A water level abnormality alarm generation cause specifying method in a wire-cut electric discharge machine having a water supplying unit for supplying a machining liquid to a machining tank, a draining unit for draining the machining liquid from the machining tank, a detecting unit for detecting a water level of the machining liquid stored in the machining tank, and a water level adjusting mechanism for supplying or draining the machining liquid based on a detection value detected by the water level detecting unit so as to adjust the water level of the machining tank, said machine having a water level abnormality detection function for generating a water level abnormality alarm when a difference between the water level detected by the water level detecting unit and a target water level exceeds a predetermined range, the method comprising the steps of:
    stopping the supply of the machining liquid to the machining tank so as to drain the machining liquid when the alarm is generated;
    displaying questions to an operator about
        (i) a change in the water level after the alarm is generated, and
        (ii) a state of the water level adjusting mechanism;
    receiving, via an inputting unit, an answer to the displayed question; and
    specifying, from the answer input by means of the inputting unit, a part which causes the generation of the alarm.

5. A wire-cut electric discharge machine having a water supplying unit for supplying a machining liquid to a machining tank, a draining unit for draining the machining liquid from the machining tank, a detecting unit for detecting a water level of the machining liquid stored in the machining tank, and a water level adjusting mechanism for supplying or draining the machining liquid based on a detection value detected by the water level detecting unit so as to adjust the water level of the machining tank, said machine having a water level abnormality detection function for generating a water level abnormality alarm when a difference between the water level detected by the water level detecting unit and a target water level exceeds a predetermined range, the wire-cut electric discharge machine comprising:
    an outputting unit for stopping the supply of the machining liquid to the machining tank so as to output a drain instruction when the alarm is generated;
    a displaying unit for displaying questions to an operator about a change in the water level and a state of the water level adjusting mechanism;
    an inputting unit for inputting an answer to the question displayed on the displaying unit; and
    a cause specifying unit for specifying, from the answer input by means of the inputting unit, a part which causes the generation of the alarm;
    wherein the questions displayed on the displaying unit to the operator about the state of the water level adjusting mechanism , displayed on the displaying unit, include questions regarding:
    clogging in a drain port,
    the existence of alarm information on a servo motor for opening and closing a drain port valve,
    excess or shortage of a water supply quantity, and
    the existence of an abnormality in a coupling for coupling the servo motor and the drain port valve to each other.

6. A water level abnormality alarm generation cause specifying method in a wire-cut electric discharge machine having a water supplying unit for supplying a machining liquid to a machining tank, a draining unit for draining the machining liquid from the machining tank, a detecting unit for detecting a water level of the machining liquid stored in the machining tank, and a water level adjusting mechanism for supplying or draining the machining liquid based on a detection value detected by the water level detecting unit so as to adjust the water level of the machining tank, said machine having a water level abnormality detection function for generating a water level abnormality alarm when a difference between the water level detected by the water level detecting unit and a target water level exceeds a predetermined range, the method comprising the steps of:
    stopping the supply of the machining liquid to the machining tank so as to drain the machining liquid when the alarm is generated;
    displaying questions to an operator about a change in the water level and a state of the water level adjusting mechanism;
    receiving, via an inputting unit, an answer to the displayed question; and
    specifying, from the answer input by means of the inputting unit, a part which causes the generation of the alarm;
    wherein the questions displayed on a displaying unit to the operator about the state of the water level adjusting mechanism include questions regarding:
    clogging in a drain port,
    the existence of alarm information on a servo motor for opening and closing a drain port valve,
    excess or shortage of a water supply quantity and
    the existence of an abnormality in a coupling for coupling the servo motor and the drain port valve to each other.

7. A water level abnormality alarm generation cause specifying method in a wire-cut electric discharge machine having a water supplying unit for supplying a machining liquid to a machining tank, a draining unit for draining the machining liquid from the machining tank, a detecting unit for detecting a water level of the machining liquid stored in the machining tank, and a water level adjusting mechanism for supplying or draining the machining liquid based on a detection value detected by the water level detecting unit so as to adjust the water level of the machining tank, said machine having a water level abnormality detection function for generating a water level abnormality alarm when a difference between the water level detected by the water level detecting unit and a target water level exceeds a predetermined range, the method comprising the steps of:
    stopping the supply of the machining liquid to the machining tank so as to drain the machining liquid when the alarm is generated;
    measuring an amount of change in the water level per unit time that is detected by the water level detecting unit;
    displaying a question to an operator about the measured amount of change in the water level and a state of the water level adjusting mechanism;
    receiving, via an inputting unit, an answer to the displayed question; and
    specifying, from the answer input by means of the inputting unit, a part which causes the generation of the alarm.

8. The water level abnormality alarm generation cause specifying method according to claim 7, wherein the questions displayed on a displaying unit to the operator about the state of the water level adjusting mechanism include questions regarding:
 clogging in a drain port,
 the existence of alarm information on a servo motor for opening and closing a drain port valve,
 excess or shortage of a water supply quantity and
 the existence of an abnormality in a coupling for coupling the servo motor and the drain port valve to each other.

* * * * *